(12) United States Patent
Krevald

(10) Patent No.: US 10,925,272 B2
(45) Date of Patent: Feb. 23, 2021

(54) TRIPOD FISHING ROD HOLDER AND PROTECTIVE STORAGE TUBE

(71) Applicant: Walter K. Krevald, Des Plaines, IL (US)

(72) Inventor: Walter K. Krevald, Des Plaines, IL (US)

(*) Notice: Subject to any disclaimer, the term of this patent is extended or adjusted under 35 U.S.C. 154(b) by 376 days.

(21) Appl. No.: 16/102,094

(22) Filed: Aug. 13, 2018

(65) Prior Publication Data

US 2020/0045951 A1 Feb. 13, 2020

(51) Int. Cl.
   *A01K 97/10* (2006.01)
   *A01K 97/12* (2006.01)
   *A01K 97/01* (2006.01)

(52) U.S. Cl.
   CPC .............. *A01K 97/10* (2013.01); *A01K 97/01* (2013.01); *A01K 97/12* (2013.01)

(58) Field of Classification Search
   CPC ........ A01K 97/01; A01K 97/08; A01K 97/10; A01K 97/12
   See application file for complete search history.

(56) References Cited

U.S. PATENT DOCUMENTS

| | | | | |
|---|---|---|---|---|
| 2,347,443 A * | 4/1944 | Vesely | ..................... | F41A 23/12 |
| | | | | 248/156 |
| 5,491,923 A | 2/1996 | Zingrone | | |
| 6,453,598 B1 * | 9/2002 | Robertson | ............. | A01K 97/10 |
| | | | | 43/21.2 |
| 7,213,361 B1 * | 5/2007 | Perigo, Sr. | ............. | A01K 97/10 |
| | | | | 248/163.1 |
| 8,276,310 B1 * | 10/2012 | Weber | .................... | A01K 97/10 |
| | | | | 43/21.2 |
| 8,375,621 B1 | 2/2013 | Tarr | | |
| 9,137,978 B1 | 9/2015 | Sullivan | | |
| 2011/0107652 A1 * | 5/2011 | Getzinger | ............ | A01K 91/065 |
| | | | | 43/19.2 |

* cited by examiner

*Primary Examiner* — Richard G Davis
(74) *Attorney, Agent, or Firm* — James P. Hanrath

(57) ABSTRACT

A protective storage tube convertible to tripod fishing rod holder having a strike indicator arm with a slidable trigger is disclosed that has multiple differing ways to establish a select fish strike tension among potential variable fish strike tensions. The protective storage tube has an elongated tubular body which provides an internal hollowed area capable of receiving a fishing rod therein during storage or transport of the protective storage tube. A slidable ring surrounds an external surface of the tubular body and has several externally facing notches and a lock cavity for an elastic cord. Two notches pivotally house an end of a pair of legs which when extended forms a tripod stand with the tubular body. A third ring notch houses a proximal end of a strike indicator arm. The strike indicator arm has slidable trigger that includes an upwardly extending finger hook for releasable engagement with one of a plurality of fishing line guide eyelets of a fishing rod. The engagement structure achieves in multiple ways an adjustable and select strike tension among potential variable strike tensions that when released provides a variable snap up of the tripod held fishing rod so as to promote increased instances of a fish lure or bait hook cleanly catching a striking fish. Also, an elastic cord can be wrapped set to either a rear or proximal portion of a tripod held fishing rod handle, the rear wrap setting providing a supplemental strike tension.

24 Claims, 13 Drawing Sheets

FIG. 4
FIG. 3
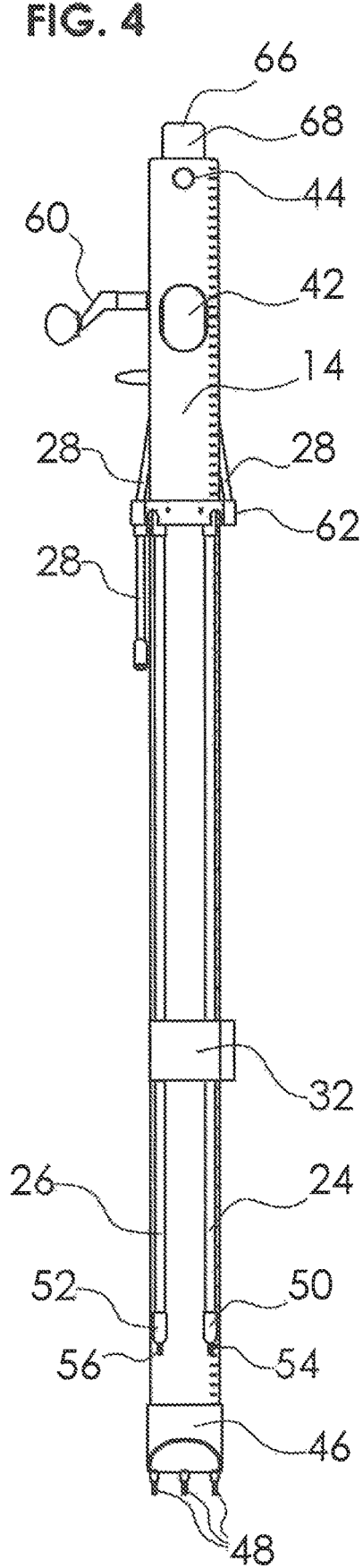
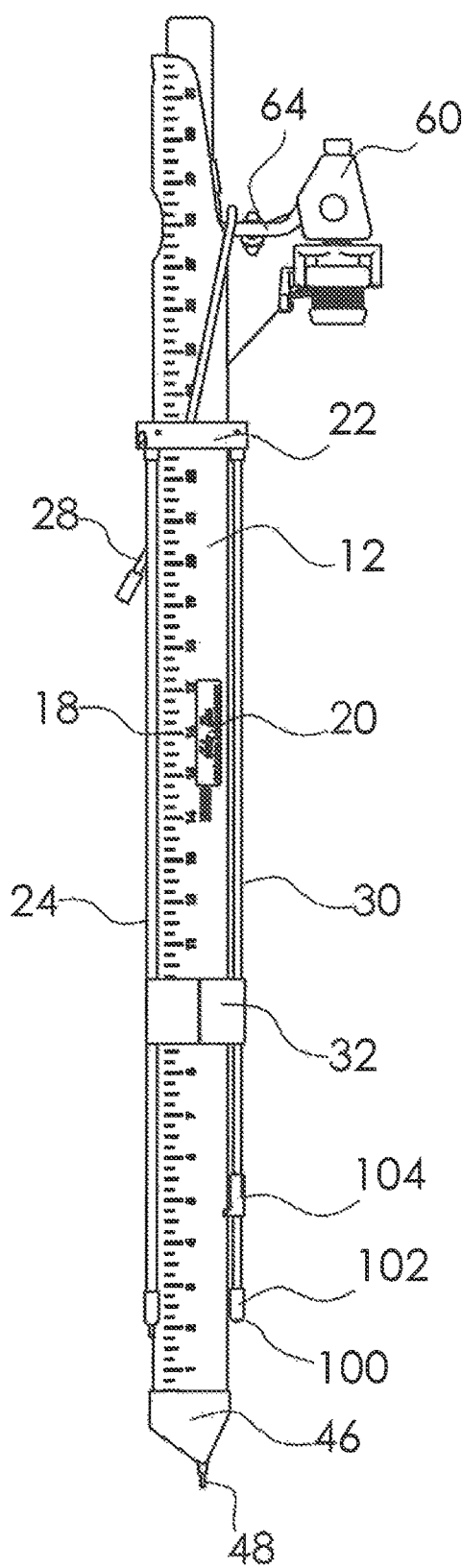

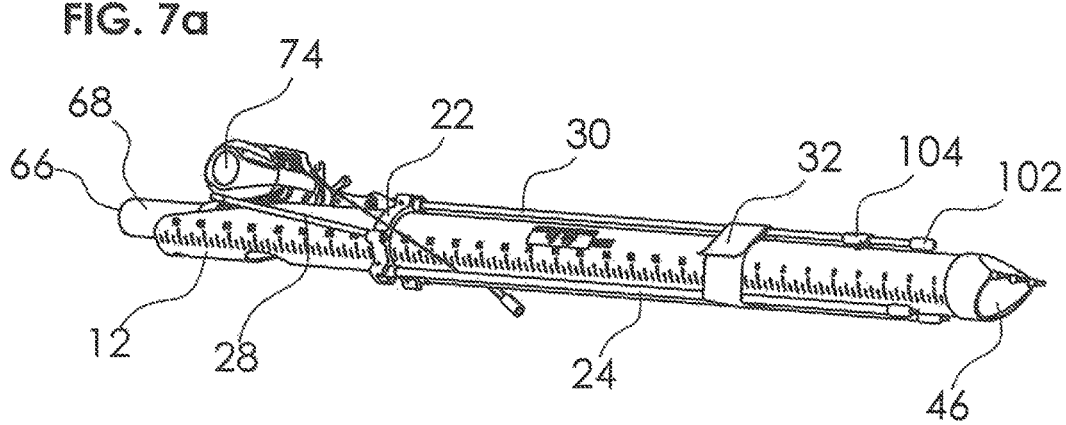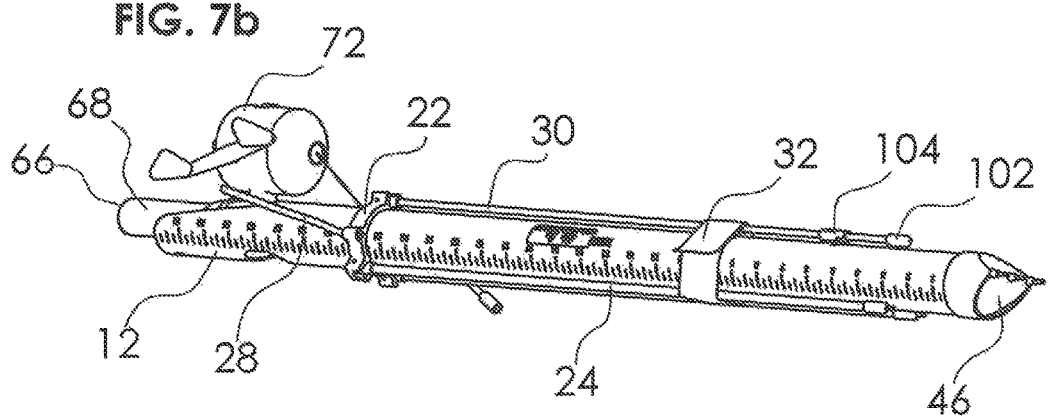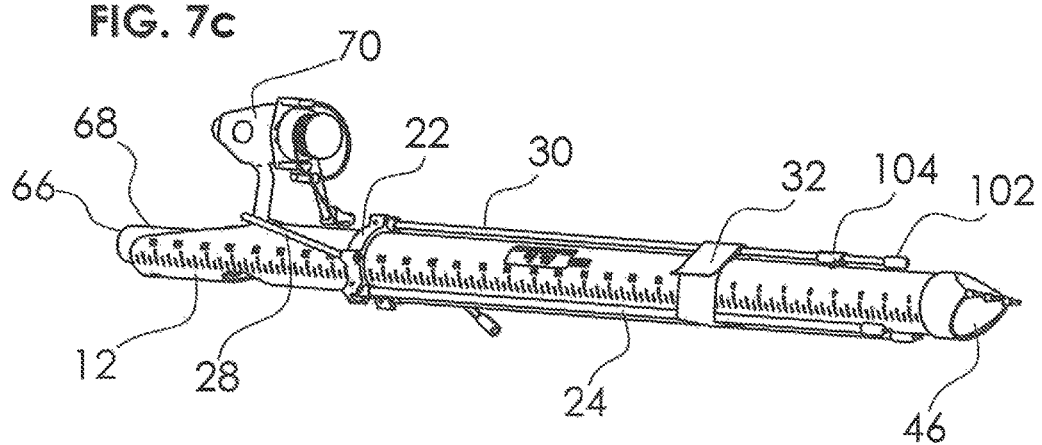

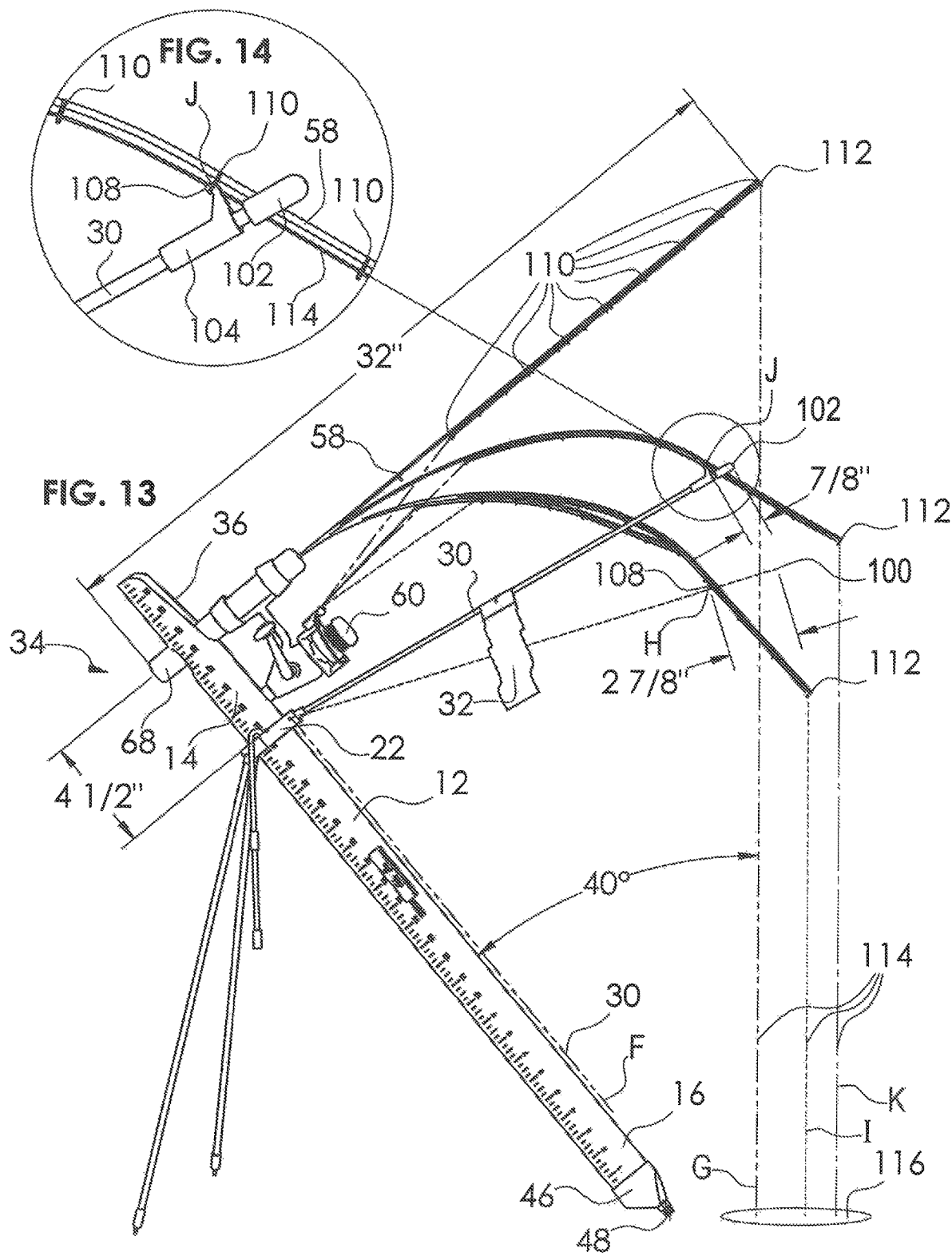

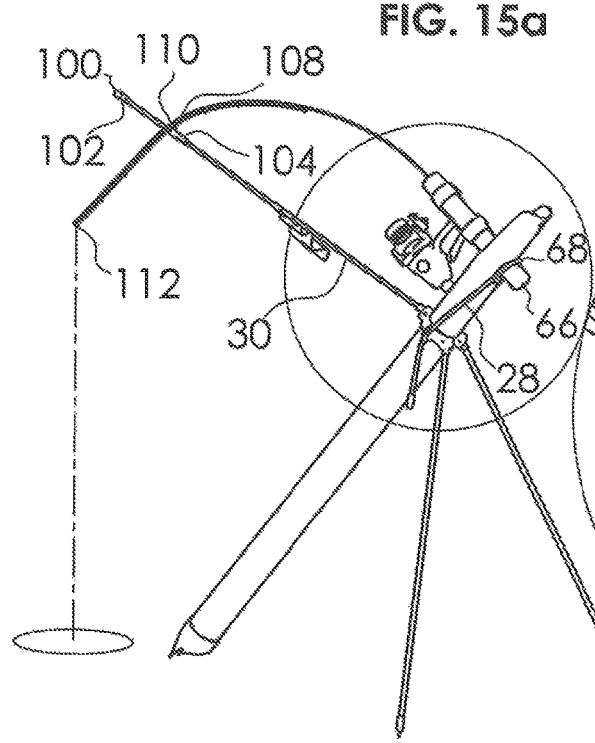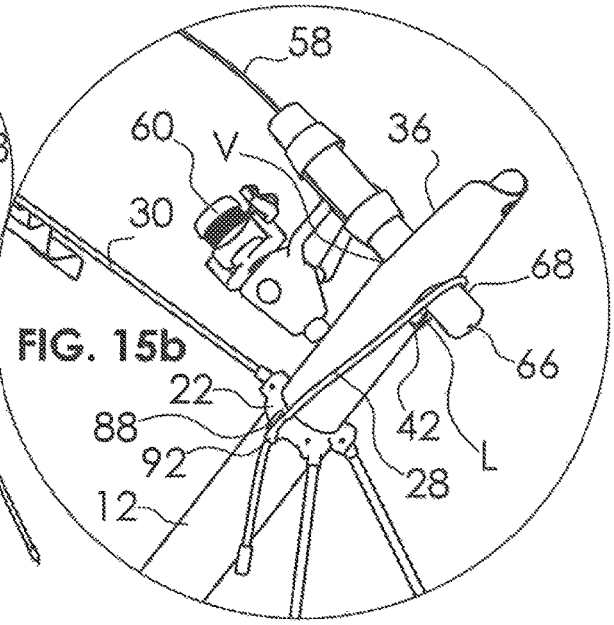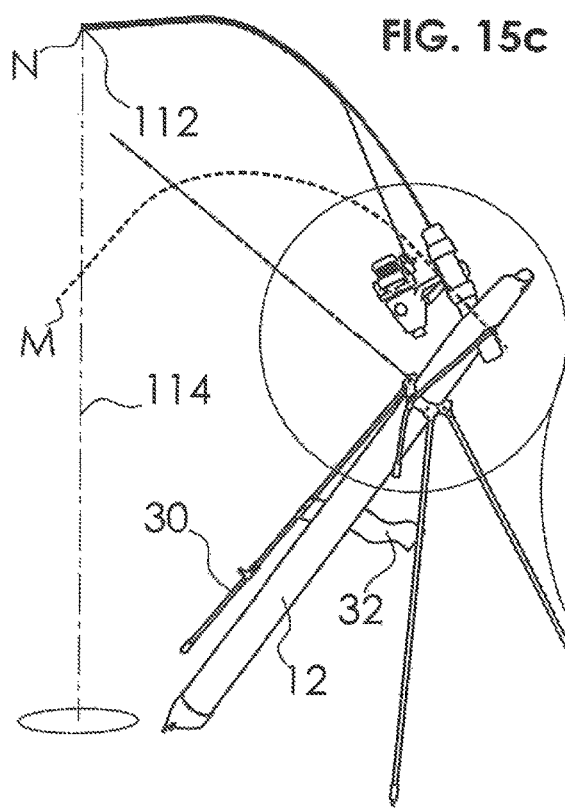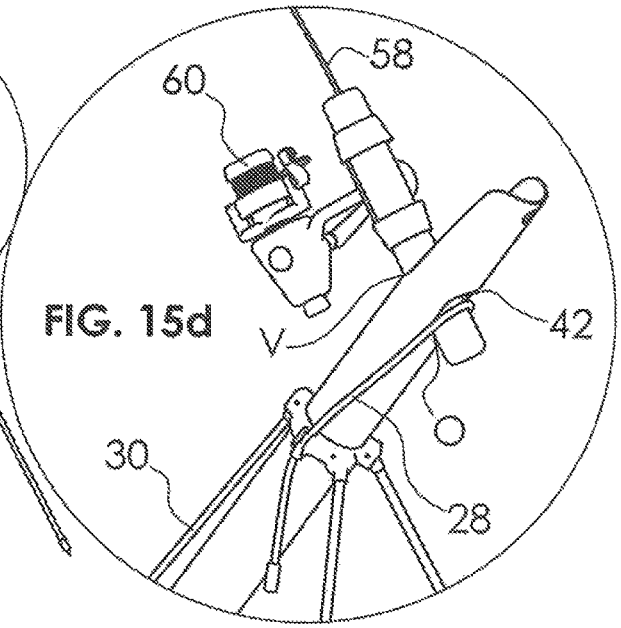

TRIPOD FISHING ROD HOLDER AND PROTECTIVE STORAGE TUBE

FIELD OF THE INVENTION

The present invention relates generally to fishing, and more particularly to a tripod fishing rod holder and protective storage tube having a strike indicator arm with a slidable trigger and multiple differing ways to establish a select fish strike tension among potential variable fish strike tensions.

BACKGROUND OF THE INVENTION

Ice fishing is a cold weather sport using delicate and expensive equipment. Pre-fishing preparedness assists in transporting gear to an ice fishing location and less manipulation thereof once there. A need has existed for ease of set-up of ice fishing equipment at an ice fishing location, particularly to avoid carrying multiple items of delicate fishing equipment to an ice fishing location for set up in the cold or for kneeling or sitting on ice to adjust or care for the fishing equipment at the site. A further need exists to accommodate various types of fishing rods and reel assemblies for such set up.

Heretofore, various devices and fishing pole holders have been proposed to aid in ice fishing. Several examples of such fishing pole holder are disclosed in the following U.S. Patents or published patent applications:

| U.S. Patent or Publication | Patentee |
| --- | --- |
| 9,137,978 | Sullivan |
| 8,375,621 | Tarr |
| 8,276,310 | Weber |
| 6,453,598 | Robertson |
| 5,491,923 | Zingrone |
| 20110107652 | Getzinger |

U.S. Pat. No. 9,137,978 to Sullivan is directed to a tipping rod and reel holder comprising an upright support with a rod and sliding reel holder member secured thereto. The rod and reel holder member includes a closed, linear, fulcrum slot with a fastener slidably fastening it to the upright support. The rod and reel holder member accepts the handle of a fishing rod therein, with the shank of the fishing reel positioned in an L-shaped slot in the holder member. The rod and reel holder member with a fishing rod and reel therein is slidably positioned on the fastener to maintain the fishing rod and reel essentially horizontal. A fish pulling on the line pivots the rod and reel holder member with rod and reel therein on the fastener, causing the rod and reel to slide within the L-shaped slot, further pivoting the rod and reel holder member away from horizontal to indicate a bite.

U.S. Pat. No. 8,375,621 to Tarr is directed to a device for holding a fishing pole. The device employs a hollow elongated pole holder for the fishing pole with elongated slots wherein a trigger is positioned. The trigger is adjustable for various weights of poles and tackles. The trigger comprises a swing arm adjustable to the weight of the fish tackle. A signal indicates a strike of the line. Sensitivity of the signal can be adjusted. A frame holds the pole holder and the pole holder is angularly disposed in relation to the frame. Removable pins are used to hold the pole holder pivotally to the frame and to the mounting plate. Another removable pin allows the pole holder to be angularly adjusted. The device can be mounted to boats, docks, the ground or to ice.

U.S. Pat. No. 8,276,310 to Weber is directed to a fishing rod holder which includes a central shaft with telescoping sections and a pair of support legs secured adjacent a first end thereof. A third support leg attached to the central shaft provides further supports. A rod support arm is pivotally secured within a vertical slot in a second end of the central shaft. The second end of the rod support arm includes a forked end with finger sections. A T-shaped hanger supported by the forked end has a central leg section pivotally secured to a strap that engages the handle of a fishing pole. The fishing pole is free to pivot up and down relative to the T-shaped hanger. Raising the fishing pole disengages the T-shaped hanger from the support arm, thereby pivoting the rod support arm to a vertical orientation. An anchor further secures the central shaft to a support surface.

U.S. Pat. No. 6,453,598 to Robertson is directed to an adjustable fishing rod stand or holder or fishing rod fishing rod holder combination is disclosed. The holder is preferably comprises an elongated base, and elongated arm, and a cradle. The elongated arm preferably has a first end and a second end with the first end being attached to the base, and the arm extending traversely from and being rotatable extendable relative to the base. The cradle is for receiving and supporting the fishing rod in a holding position. The cradle should be pivotally attached to the second end of the elongated arm, allowing the fishing rod holder to support the fishing rod in variable, inclined upright positions suitable for fishing. The fishing rod/fishing rod holder of the present invention may be used to support a fishing rod on any surface, and optionally remains attached to the rod when the user transports the rod or casts the fishing line.

U.S. Pat. No. 5,491,923 to Zingrone is directed to an improved fishing pole holder for use in ice fishing. The pole holder is movably mounted in an aperture in a bucket wall so that the pole may be held in an up attitude. A fish bites on bait connected to the fishing pole pulls the fishing pole into a pole down attitude to signal that a fish is on the line. The fishing pole holder includes an elongated beam which has a pole handle receptacle on one end and a pole support on the other end. The pole handle receptacle receives a handle from a fishing pole and the pole support holds up the rod portion of the pole. An elongated shaft is fixed to the beam. The shaft is pivotally mounted in the aperture. A stop is mounted on the shaft adjacent to one side of the wall, and a second stop is mounted on the shaft adjacent to the other side of the wall. A resilient compressive member is positioned adjacent to one side of the wall between the wall and one of the stops. The resilient compressive member is placed into a selected compressed state to apply a selected amount of force against the wall to determine the force required to rotate the shaft relative to the wall and thereby determine the force required to pivot the fishing pole to a pole down attitude.

U.S. Patent Application Publication 20110107652 to Getzinger is directed to an ice fishing apparatus features a support stand engaging and projecting upward from a frozen surface of a body of water and projecting laterally outward at a distance above the frozen surface. A flexible strip has a fixed end coupled to the stand and extends past a distal end laterally outward from the upright portion of the stand engaged in the ice. A wind flap is coupled to the flexible strip at a position there along between the distal end of the stand and a free end of the flexible strip. A reel support is provided on the support stand and a clip near the free end of the strip is used for gripping fishing line from the reel to move the hook end of the line with the strip under action of moving air on the wind flap.

Heretofore certain problems with fishing and ice fishing rod holders have been identified. One is ease of use. A fishing rod either must be held by hand or positioned so that the user can quickly retrieve the rod when a fish has struck a lure or hook attached to a line of the fishing rod. In inclement winter weather during ice fishing at an ice fishing hole a fishing rod holder advantageously allows one to avoid handling cold materials and maintain hand warmth.

Another problem is that a fishing pole holder may be designed and be usable for only one type of fishing rod and reel assemblies, such as for short curved fishing rods, hand rods, on-shore rods, off-shore rods, or other types of rods.

Another problem is that the time between fish strikes can be unpredictable and the user of the fishing rod may not be closely observing the rod or may be out of sight of the rod for a period of time. This is a particular problem at dawn, at dusk and during night time fishing.

A need exists for a fishing or ice fishing rod holder that accommodates different types of fishing rod and reel assemblies with a device of easy set-up that readily notifies the user that a fish strike is occurring and that allows for a fish strike to be indicated during high visibility situations as well as low visibility situations.

Although the foregoing described fishing devices have utilitarian features, a more particular need exists for a readily useable fishing rod holder with a strike indicator that accommodates and safeguards a variety of fishing poles and/or fishing rod and reels, from the point in time of protective storage, transport travel to and from ice or other fishing locations, and during ice fishing in a manner that minimizes cold weather set up and avoids kneeling on ice. Further, a more particular need exists for a readily useable fishing rod holder with a strike indicator to achieve an adjustable and select strike tension among potential variable strike tensions when a fish takes or hits upon a fishing line lure or bait. A further particular need exists for an adjustable strike tension setting of a tripod held fishing rod that is variable and differentiated to be correlated to different types of fish or to what a fisherman considers to be an appropriate "bite" or fish strike that allows variable loaded hold/release tensions to be released in a variable snap up manner of a tripod stand held fishing rod tip so as to promote increased instances of a fish lure or bait hook cleanly catching a striking fish in its frontal mouth lip as opposed to its gills or deeper in the fish mouth. This in turn relates to the need for greater instances of clean fish catch and safe fish release in the event of a catch of a wrong fish species, out of season fish, or fish otherwise disqualified by size or other regulation.

Still further, it is desirable to address the foregoing needs with a tripod fishing rod holder and protective storage tube having a strike indicator arm with a slidable trigger and multiple differing ways to establish a select fish strike tension among potential variable fish strike tensions that is not limited to ice fishing situations and that may be used in many diverse fishing environments.

SUMMARY OF THE INVENTION

In accordance with the present invention, there is provided a protective storage tube convertible to a fishing rod holder with a strike indicator arm comprising a tubular body having a proximal section and a distal section, the proximal section having a rear circular opening and a frontal opening therein, the tubular body being elongated and providing an internal hollowed area capable of a reception of a fishing rod therein during storage or transport of the protective storage tube; a ring having an internal surface surrounding an external surface of the tubular body, the ring having two externally facing notches each housing an end of a leg of a pair of legs, the pair of legs and tubular body capable of forming a tripod stand; and the ring further having a third externally facing notch housing a proximal end of a strike indicator arm, the strike indicator arm having a slidable trigger capable of being releasably engaged with one of a plurality of fishing line guide eyelets of a fishing rod.

The present invention also provides for a fishing rod holder with a strike indicator arm comprising a tubular body having a proximal section and a distal section, the proximal section having a rear circular opening and a frontal opening therein, the tubular body being elongated and providing an internal hollowed area capable of a reception of a fishing rod therein during storage or transport of the protective storage tube; a ring having an internal surface surrounding an external surface of the tubular body, the ring having two externally facing notches each of which pivotally houses an end of a leg of a pair of legs, the pair of legs and tubular body capable of forming a tripod stand; the ring further having a third externally facing notch which pivotally houses a strike indicator arm, the strike indicator arm having a slidable trigger that includes an upwardly extending finger hook capable of releasable engagement with one of a plurality of fishing line guide eyelets of a fishing rod; the ring further having a lock cavity housing an end of an elastic cord and a fourth notch for releasable setting of either an intermediate catch member or an end catch member of the elastic cord; the tubular body, after a tripod stand set-up, being capable of having a fishing rod held in the tripod stand by a frontal portion of a fishing rod handle being set within the frontal opening of the tubular body and a rear portion of the fishing rod handle being inserted through the rear circular opening of the tubular body; and wherein the elastic cord being is capable of being wrapped around either the rear or the frontal portion of a fishing rod handle at, respectively, either a rear or a frontal side of the tubular body, with a releasable setting of either the intermediate catch member or an end catch member of the elastic cord within the fourth notch, the rear wrapping setting thereof being capable of providing a supplemental strike tension during a releasable engagement of the upwardly extending finger hook of the slidable trigger with one of a plurality of fishing line guide eyelets of a fishing rod.

The present invention further provides for a protective storage tube convertible to a fishing rod holder with a strike indicator arm in combination with a fishing rod comprising a tubular body having a proximal section and a distal section, the proximal section having a rear circular opening and a frontal opening therein, the tubular body being elongated to provide an internal hollowed area suitable for reception of the fishing rod therein during storage or transport of the protective storage tube; a ring having an internal surface surrounding an external surface of the tubular body, the ring having two externally facing notches each of which pivotally houses an end of a leg of a pair of legs, the pair of legs and tubular body capable of forming a tripod stand; the ring further having a third externally facing notch which pivotally houses a strike indicator arm, the strike indicator arm having a slidable trigger that includes an upwardly extending finger hook capable of releasable engagement with one of a plurality of fishing line guide eyelets of the fishing rod; the ring further having a lock cavity housing an end of an elastic cord and a fourth notch for releasable setting of either an intermediate catch member or an end catch member of the elastic cord; the tubular body, after a tripod stand set-up, being capable of having a fishing rod held in the tripod stand by a frontal portion of a fishing rod handle being set within the frontal opening of the tubular body and a rear portion of the fishing rod handle being inserted through the rear circular opening of the tubular body; and wherein the elastic cord is capable of being wrapped around either the rear or the frontal portion of a fishing rod handle at, respectively, either a rear or a frontal side of the tubular body, with a releasable setting of either the intermediate catch member or an end catch member of the elastic cord within the fourth notch, the rear wrapping setting thereof being capable of providing a supplemental strike tension during a releasable engagement of the upwardly extending finger hook of the slidable trigger with one of a plurality of fishing line guide eyelets of a fishing rod.

The foregoing variations of the present invention also provide for an upwardly extending finger hook of the slidable trigger to releasably engage a select fishing line guide eyelet of a fishing rod to establish a select fish strike tension among potential variable fish strike tensions. Further the strike indicator arm includes an end cap at its distal end and the upwardly extending finger hook of the slidable trigger is capable of an engagement with a select fishing line guide eyelet of a fishing rod at varying distances from the end cap. The distance of the upwardly extending finger hook of the slidable trigger from the end cap during an engagement with a select fishing line guide eyelet of a fishing rod also establishes a select fish strike tension among potential variable fish strike tensions.

The present invention advantageously provides for a tripod fishing rod holder with a strike indicator arm and protective storage tube that works in various fishing environments with various types of fishing rod reels (open face, closed face, bait caster) that accommodates in an elevated supportive position a broad range of rod lengths, all with ease of set up. Additionally, a strike indicator arm of the present invention includes a sliding trigger with a finger hook that can be easily set and adjusted for engagement with a select among a plurality of fishing line guide eyelets of a fishing rod to establish varying fish strike tension among a plurality of potential fish strike tension that releasably locks at a consistent angle of the rod line over a fishing location, such as, but not limited to an ice fishing hole. When the finger hook is released by a fish strike, a resultant upward thrust of the rod sets the fish hook.

The readily useable fishing rod holder with a strike indicator of the present invention accommodates and safeguards a variety of fishing poles and/or fishing rod and reels, from the point in time of protective storage, transport travel to and from various fishing locations, and during ice fishing in a manner that minimizes cold weather set up and avoids kneeling on ice. Further, the readily useable fishing rod holder with a strike indicator achieves in multiple ways an adjustable and select strike tension among potential variable strike tensions when a fish takes or hits upon a fishing line lure or bait. This adjustable and select variable and differing setting of a strike tension of a tripod held fishing rod can be correlated to different types of fish or to what a fisherman considers to be an appropriate "bite" or fish strike. This allows variable loaded hold/release strike tensions to be released in a variable snap up manner of the tripod stand held fishing rod tip so as to promote increased instances of a fish lure or bait hook cleanly catching a striking fish in its frontal mouth lip as opposed to its gills or deeper in the fish mouth. This in turn promotes for greater instances of clean fish catch and safe fish release in the event of a catch of a wrong fish species, out of season fish, or fish disqualified by size or other regulation.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3 is a side vertical view of the fishing rod holder and protective storage tube of FIG. 1 in a storage or transport state but now having a fishing rod and reel.

FIG. 4 is a rear vertical view of the fishing rod holder and protective storage tube of FIG. 3 in a storage or transport state with a fishing rod and reel.

FIGS. 7a, 7b, and 7c are a side vertical view of the fishing rod holder and protective storage tube of FIG. 3 in a storage or transport state now showing varied types of fishing rod and reels accommodated therein, namely, respectively, a bait caster, a closed face reel, and an open face reel.

FIG. 13 is a side perspective view of the fishing rod holder and protective storage tube of FIG. 12 after tripod fishing set-up of a greater length fishing rod and reel at a fishing location.

FIG. 14 is a partial side perspective enlarged call-out view of the fishing rod holder and protective storage tube of FIG. 13 wherein a slidable trigger of a strike indicator arm is engaged to a fishing rod line guide eyelet.

FIGS. 15a, 15b, 15c, and 15d are side perspective views of the fishing rod holder and protective storage tube of FIG.

12 showing at FIG. 15a and enlarged call-out view 15b a setting of the strike indicator arm to a fishing rod line guide eyelet with the elastic cord engaging the butt end of the fishing rod handle at the rear side of the protective storage tube and at FIG. 15c and enlarged call-out view 15d its release upon a fish strike at a fishing location.

Figure 12:
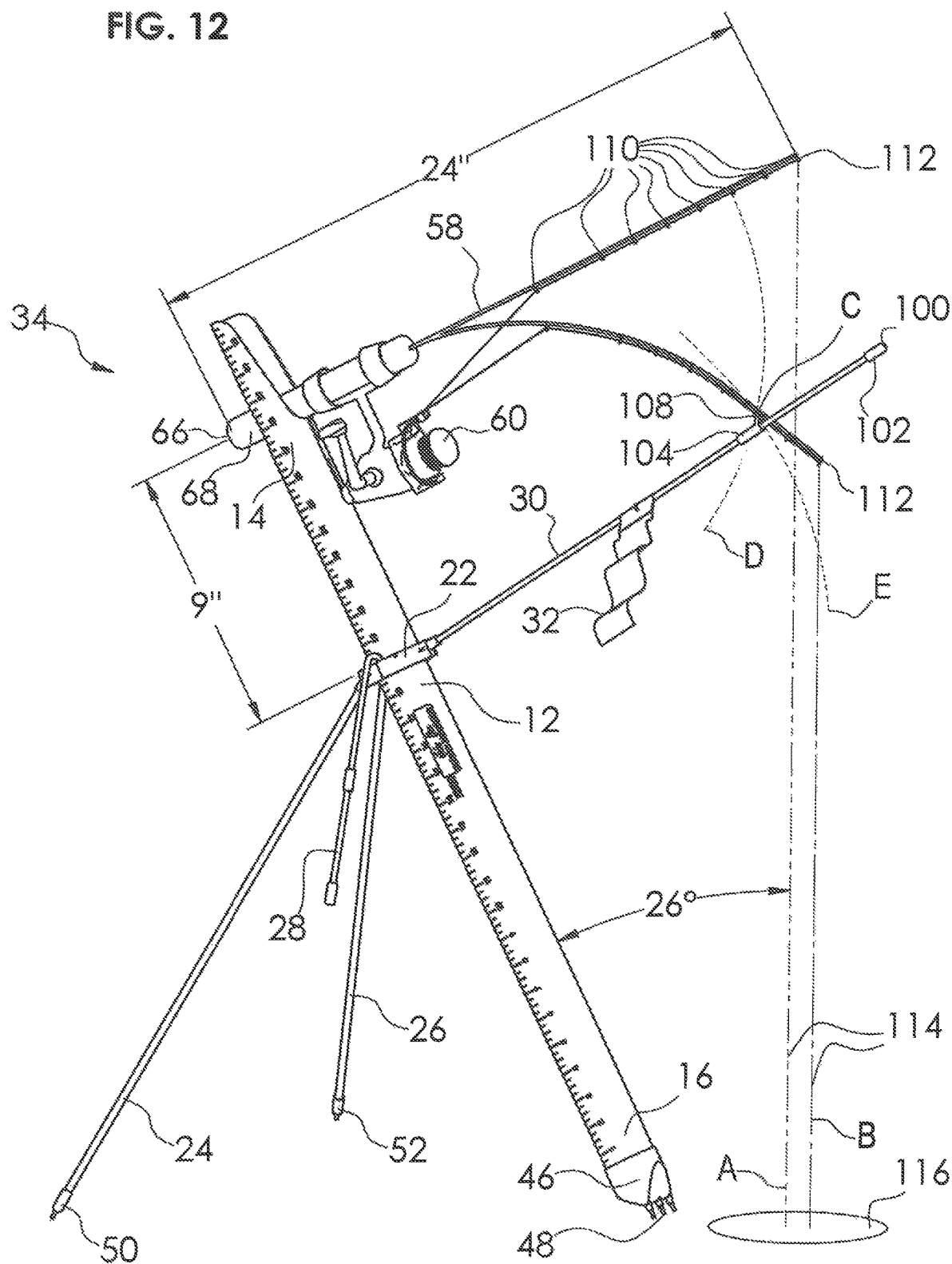
FIG. 12 is a side perspective view of the fishing rod holder and protective storage tube of FIG. 1 after tripod fishing set-up of a fishing rod and reel at a fishing location.
Figure 16A:
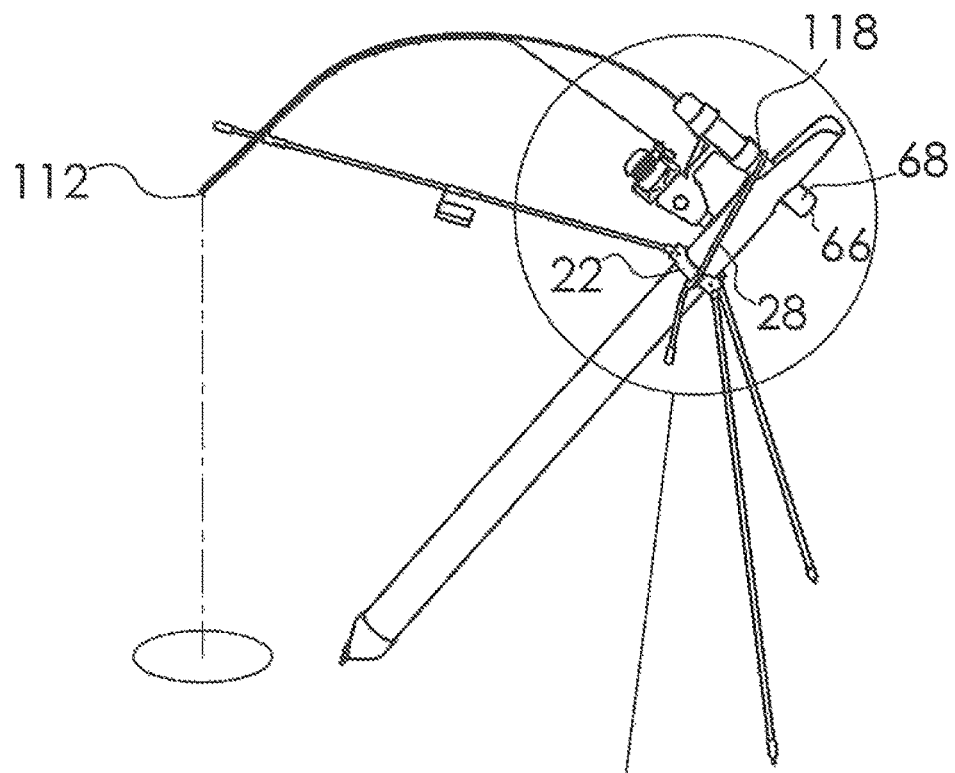
Figure 16B:
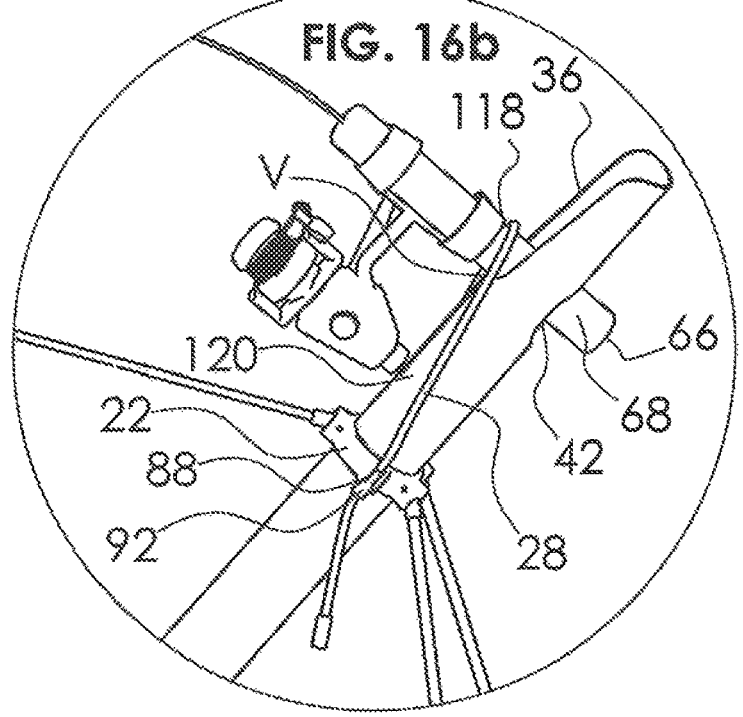

FIG. 16a and enlarged call-out view 16b are side perspective views of the fishing rod holder and protective storage tube of FIG. 12 similar to the showing at FIG. 15a, 15b but now having the elastic cord set at the frontal face of the protective storage tube at a fishing location.

DETAILED DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated. In particular, although hereinafter reference may be made to ice fishing it is expressly noted that the tripod fishing rod holder and protective storage tube of the present invention is not limited to ice fishing environments or ice fishing qualifications or limitations.

As used herein, the term "strike tension" refers to the cumulative amount of loaded forces set by the engagement of the upwardly extending finger hook of the slidable trigger of the strike indicator arm of the present invention with a select fishing line guide eyelet of a tripod stand held fishing rod, inclusive of any supplemental forces of an elastic cord engagement of a fishing rod handle set within the tripod stand, that must necessarily be overcome to release such engagement at the moment they are caused to be released by a fish strike pulling upon a fishing lure or hook. As discussed hereinafter, this "strike tension" can be variably adjusted and selectively set in multiple ways by the structure of the present invention.

Figure 1:
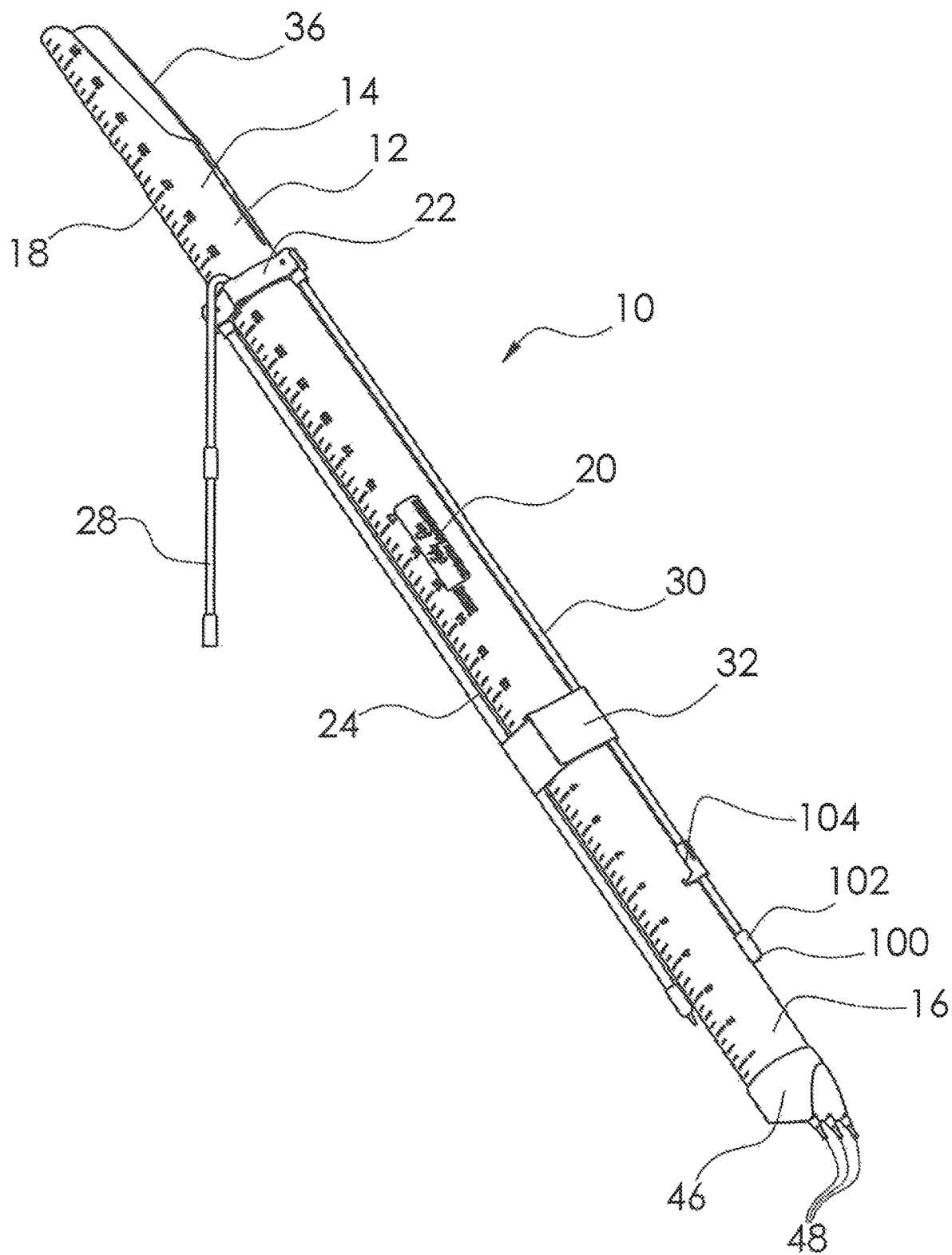
FIG. 1 is a side perspective view of the fishing rod holder and protective storage tube of the present invention in a storage or transport state and without a fishing rod and reel.
Figure 2:
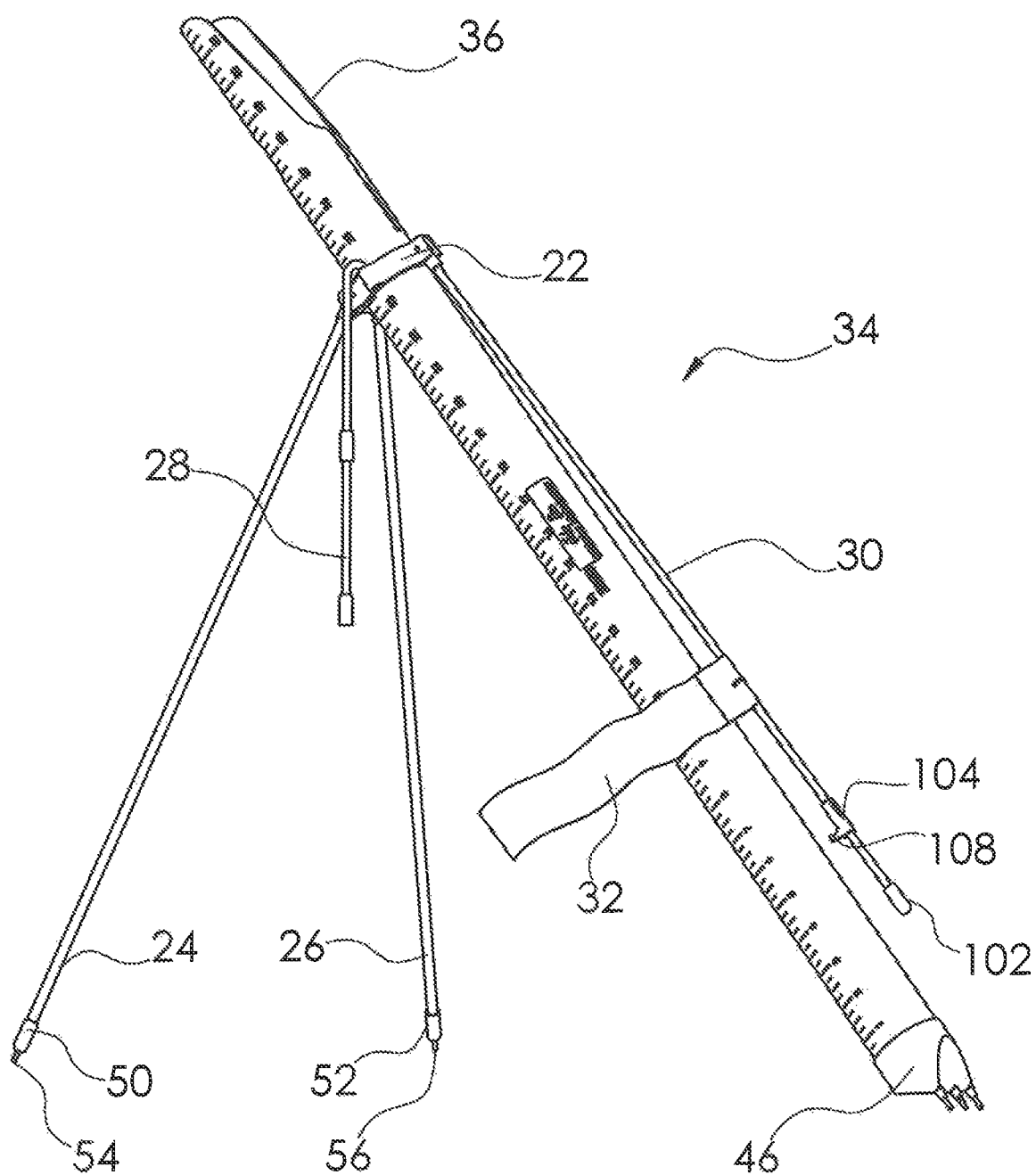
FIG. 2 is a side perspective view of the fishing rod holder and protective storage tube of FIG. 1 in an initial set-up state without a fishing rod and reel wherein a pair of rod legs cooperates with the protective storage tube to provide a tripod stand for holding a fishing rod and reel.

FIG. 1 shows a side perspective view of a fishing rod holder and protective storage tube 10 of the present invention in a storage or transport state and without a fishing rod and reel. Storage tube 12 is a generally cylindrical elongated tubular body having a proximal end 14 and a distal end 16. Storage tube 12 has measurement indicia 18 on one side thereof in order to measure the length of legal fish that may be required by a fishing regulation. An additional indicia section 20 may optionally be provided to storage tube 12 to, for example, contain the name or contact information of the tube owner or other identity or advertising information. The storage tube 12 also has an adjustable ring 22 to hold a pair of legs 24, 26, an elastic cord 28, and a strike indicator arm 30. The ring 22 is adjustable by its slidable resistance fit along the exterior of tube 12. In FIG. 1 the pair of legs 24, 26 are in a closed storage or transport state being held to the storage tube 12 by a loop and hook engagement of flag strap 32. As seen in FIG. 2, upon release of the flag strap 32 the pair of legs 24, 26, being pivotally connected to the adjustable ring 22, may be outwardly displayed from the tube 12 and disposed with respect to tube 12 to form a tripod stand 34 of the fishing rod holder and protective storage tube.

Figure 8A:
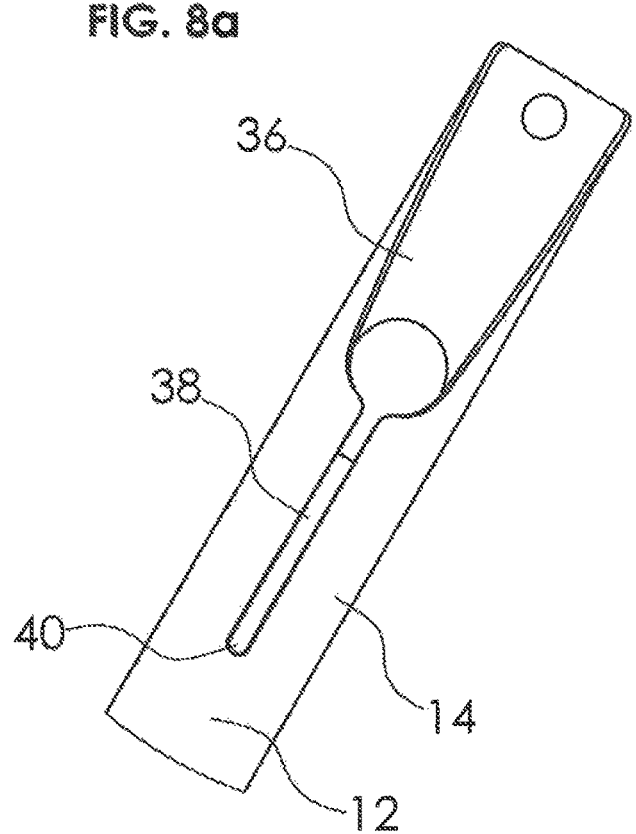
FIGS. 8a and 8b are, respectively, a partial top front view and a partial top rear view of the fishing rod holder and protective storage tube of FIG. 1 now showing, respectively, frontal and rear openings of the proximal end of the storage tube.
Figure 8B:
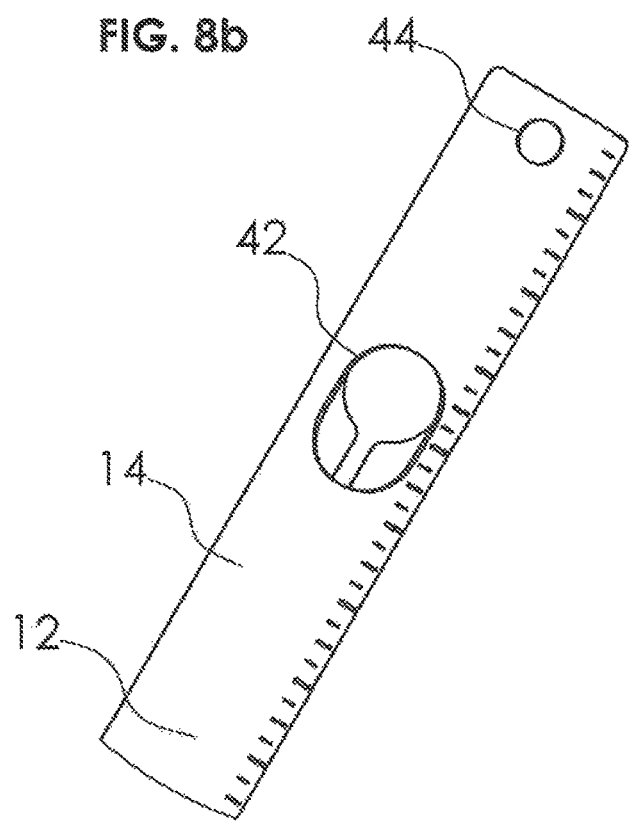

As best seen at the partial view of FIG. 8a, the tube 12 at its proximal end 14 has a first elongated opening 36 for the stem of a fishing reel on the frontal side of tube 12 which extends into an anti-chafing slot 38 for fishing line of the fishing reel. The distal terminal end of the slot 38 has a polished smooth radius edge 40 free of burses to avoid chafing of a fishing line extending there over. As best seen at the partial top rear view of FIG. 8b at the rear of proximal end 14 of tube 12 also has a second circular opening 42 to capture and hold the butt end of a fishing rod handle and a third circular opening 44 for cooperation with a hook or other options to hang or store the tube 12. As shown in FIGS. 1 and 2, the distal end 16 of the tube 12 extends into an end cap 46 having a plurality of seating teeth 48 angularly position therefrom for stable engagement to a fishing location surface, inclusive of an ice surface during ice fishing, so as to provide stability to the tripod stand 34. Similarly, the pair of legs 24, 26 of the tube 12 at their distal ends extend into leg caps, 50 and 52 respectively, with each leg cap having a spike tooth 54 and 56 respectively, again provided to stabilize the tripod stand 34 when set at a fishing location.

Figure 5:
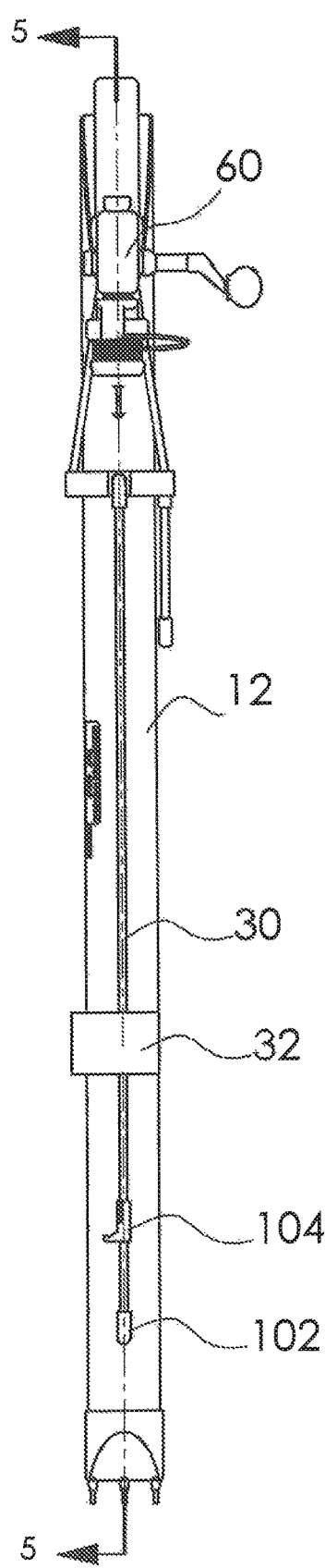
FIG. 5 is a frontal vertical view of the fishing rod holder and protective storage tube of FIG. 3 in a storage or transport state with a fishing rod and reel.
Figure 6:
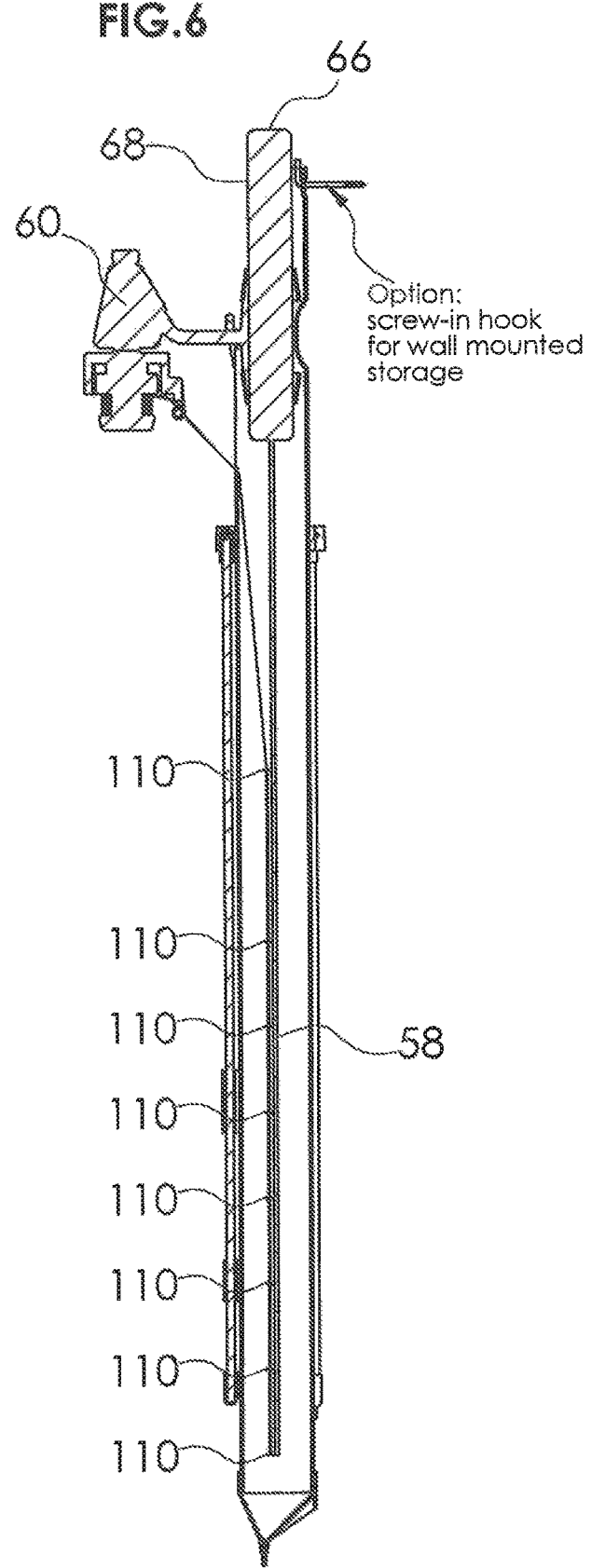
FIG. 6 is a side cross-sectional elevation view, taken along the line 5-5 of FIG. 5, of the fishing rod holder and protective storage tube of FIG. 3 in a storage or transport state with a fishing rod and reel.

FIGS. 3 to 6 show various vertical views of the fishing rod holder and protective storage tube 10 of FIG. 1 in a storage or transport state but now with a fishing rod 58 and reel 60 set therein. FIG. 3 is a side vertical view of the fishing rod holder and protective storage tube 10 showing the measurement indicia side of the tube 12, In this view the flag strap 32 captures the legs 24, 26 and the strike indicator arm 30 in a closed storage and transport position at the exterior of tube 12. Note at FIGS. 3 and 4 that the elastic cord 28 extends from its seated end 62 in adjustable ring 22 proximally around the stem 64 of reel 60 before another portion of the elastic cord is set at a different portion of the adjustable ring 22 (see FIG. 5) as discussed later. FIG. 4 is a rear view and shows legs 24, 26 bound to tube 12 by flag strap 32 and butt end 66 of a fishing rod handle 68 extending from the interior of the fishing rod holder and protective storage tube 10. The frontal vertical view of FIG. 5 shows the strike indicator arm 30 strapped to the tube 12 and the cross-sectional view of FIG. 6, taken along line 5-5 of FIG. 5, shows fishing rod 58 interior of and in the hollow of tube 12.

Referring now to FIGS. 7a, 7b, and 7c, the same illustrates that a variety of fishing rods and reels can be stored in tube 12. FIG. 7a has a bait caster 74, FIG. 7b has a closed face reel 72 and FIG. 7c has an open face reel 70.

Figure 9:
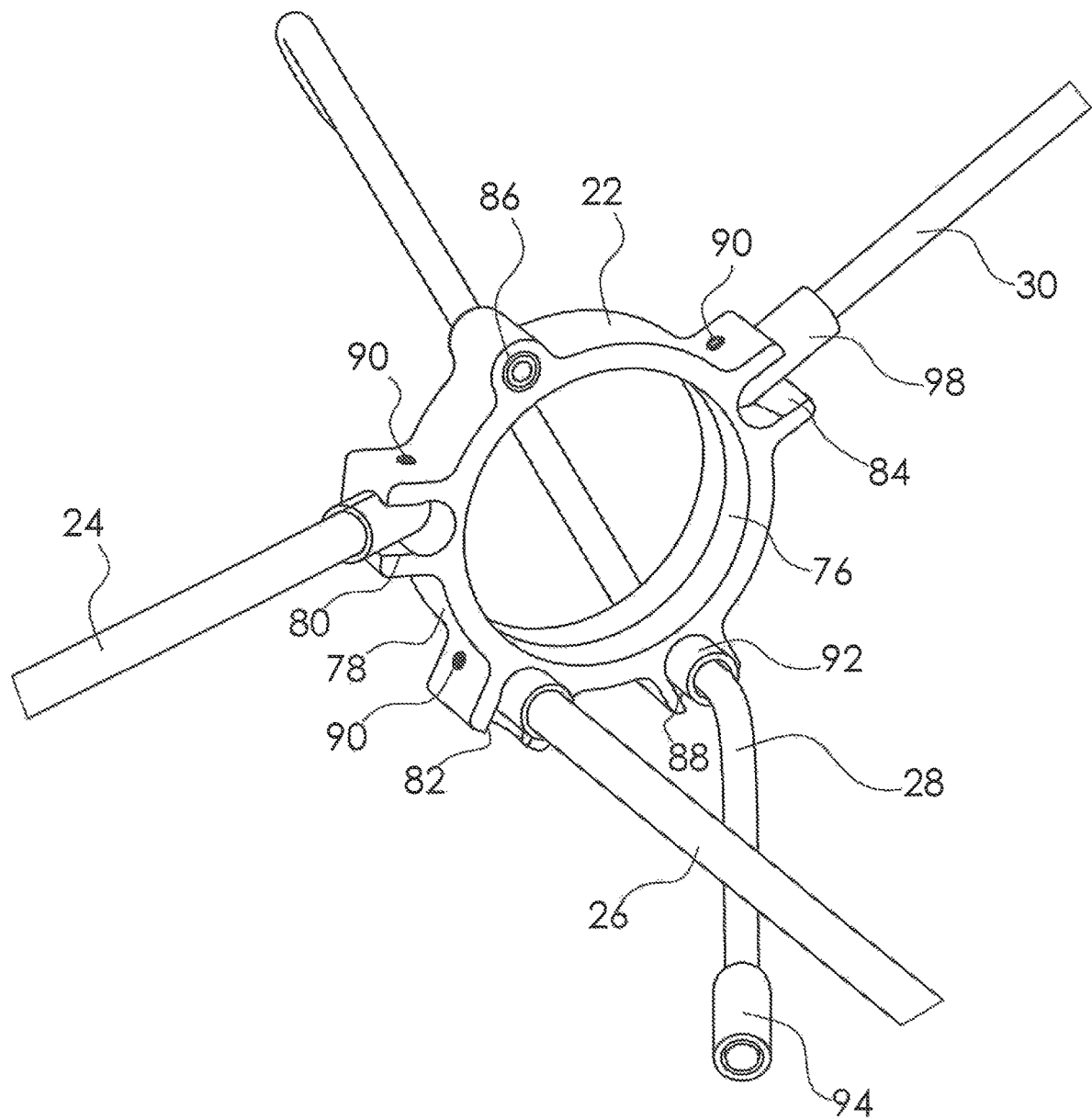
FIG. 9 is a bottom perspective view of the adjustable ring of the fishing rod holder and protective storage tube of FIG. 1.

At FIG. 9 the adjustable ring 22 of the fishing rod holder and protective storage tube is show as a component part. Adjustable ring 22 has an annular interior 76 suited to provide resistance fit slidable movement of the ring along the exterior surface of tube 12. The peripheral exterior surface 78 of the adjustable ring 22 has a plurality of notches, namely leg supporting notches 80 and 82, a strike indicator arm supporting notch 84, and cord catch notch 88 cooperative with a lock cavity 86. Pivot pins 90 pivotally secure the pair of legs 24, 26 of the fishing rod holder and protective storage tube 10 within notches 80 and 82 such that the legs, when unsecured by flag strap 32, may be outwardly display from and disposed with respect to tube 12 to form tripod stand 34 for holding a fishing rod and reel during fishing. Notches 80 and 82 may be detented to define a hard stop catch of the full in and full out cam areas of leg travel. In similar fashion, the strike indicator arm supporting notch 84 may be detented to define a hard stop catch of the full in and full out cam areas of otherwise unrestricted travel of the strike indicator arm 30.

In a similar manner another pivot pin 90 may pivotally secure the strike indicator arm 30 of the fishing rod holder and protective storage tube 10 within notch 84 such that the arm, when unsecured by flag strap 32, may be outwardly display from tube 12 to engage a fishing line guide eyelet of fishing rod as later discussed.

Figure 10:
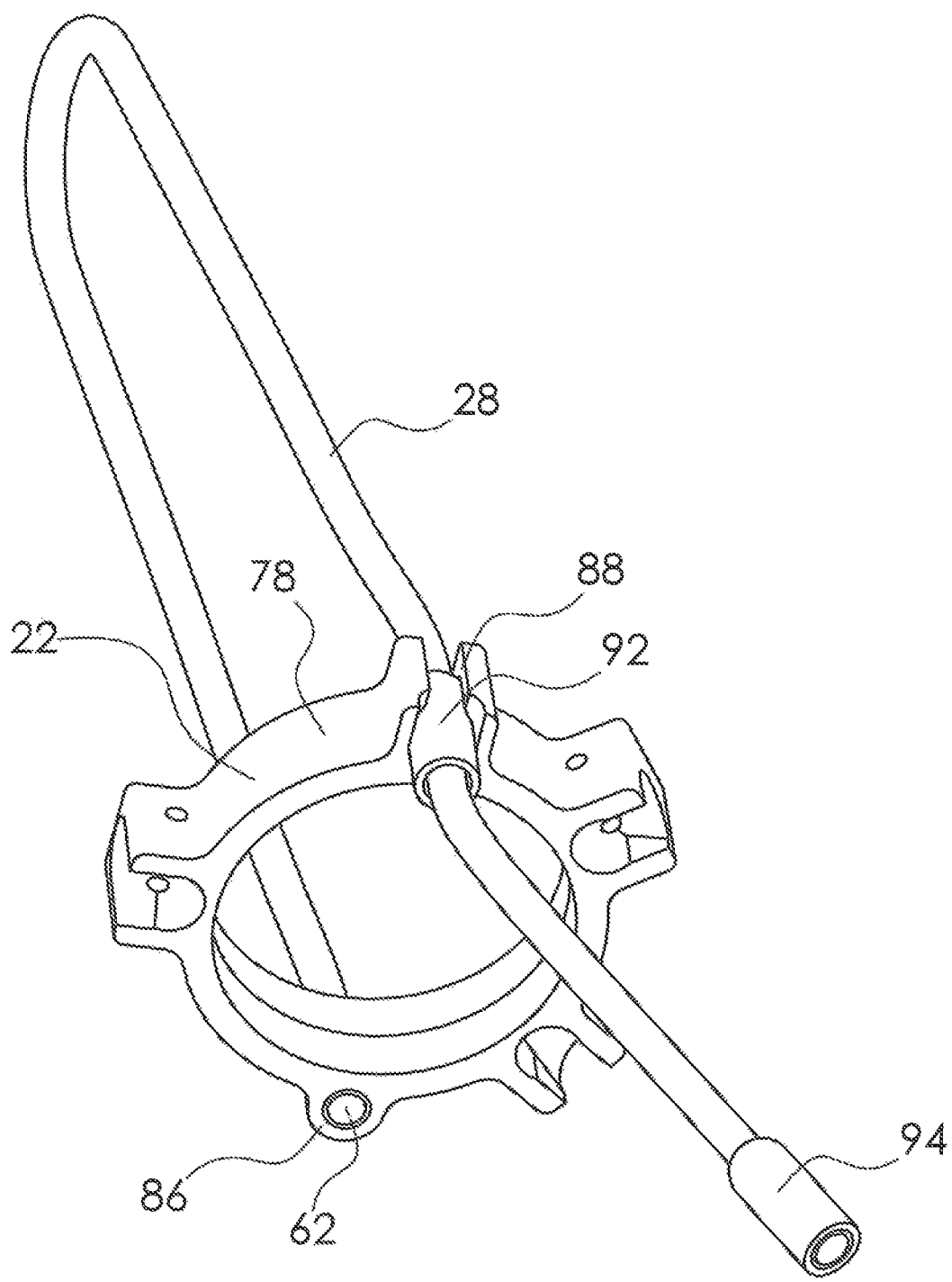
FIG. 10 is a bottom perspective view of the adjustable ring of the fishing rod holder and protective storage tube of FIG. 1 showing the intermediate cord catch of the elastic cord set in a peripheral notch of the adjustable ring.

As shown in FIG. 10, the lock cavity 86 and cord catch notch 88 are located preferably 180 degrees apart from one another along the peripheral exterior surface 78 of the adjustable ring 22 with lock cavity 86 permanently securing the seated end 62 of the elastic cord 28 within it and the notch 88 providing a releasable catch of either an intermediate catch member 92 or an end catch member 94 of the elastic cord 28. The seated end 62 of the elastic cord 28 may be knotted or have a crimped ferrule, bushing or adapter to assure a permanent anchored fit within lock cavity 86. The releasable catch of either the intermediate catch member 92 or the end catch member 94 of the cord 28 may likewise be knotted or have a crimped ferrule, bushing or adapter to assure a releasable but secured fit setting within cord catch notch 88.

Figure 11:
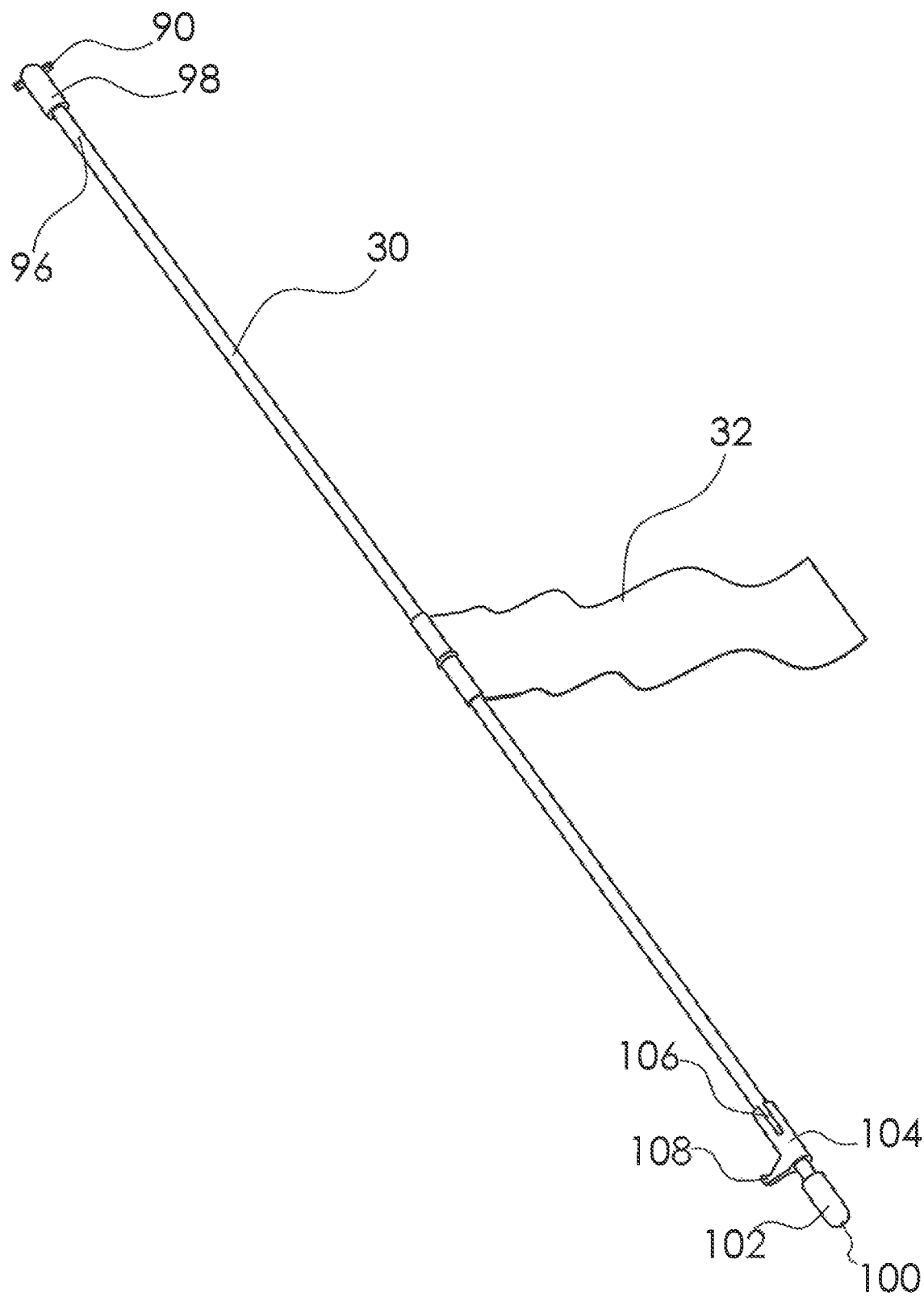
FIG. 11 is a perspective view of the strike indicator arm component of the adjustable ring of the fishing rod holder and protective storage tube of FIG. 1 showing a slidable trigger and a flag strap thereon.

At the perspective view of FIG. 11, the strike indicator arm 30 is illustrated alone as a component piece separated from its notch 84 of the adjustable ring 22 of the fishing rod holder and protective storage tube 10. The strike indicator arm 30 at its proximal end 96 has a proximal end cap 98 cooperative with pivot pin 90 for setting of this end within notch 84. At its terminal distal end 100 there is a distal end cap 102 press fitted on the strike indicator arm 30 which serves as a stop for slidable trigger 104. Slidable trigger 104 has a slot 106 promoting a slidable interference fit of the trigger along strike indicator arm 30. The slidable movement of the trigger 104 allows an upwardly extending finger hook 108 thereof to be aligned with and releasably lock set to one of a plurality of fishing line guide eyelets 110 in a manner later discussed in association with FIGS. 12, 13, and 14. The strike indicator arm 30 also includes a flag strap 32 suitable to wrap around the protective storage tube to strap hold, in hook and loop engagement fashion, the pair of legs in a retracted closed storage or transport position and to serve as a free-standing flag when the pair of legs and the protective storage tube forms a tripod stand.

When at a fishing location, the fishing rod holder and protective storage tube 10 can be readily set-up in a tripod manner as depicted in FIG. 12 wherein the release of the flag strap 32 allows the pair of legs 24, 26 pivotally connected to the adjustable ring 22 to be outwardly displayed from the tube 12 and disposed with respect to tube 12 to form a tripod stand 34 of the fishing rod holder and protective storage tube. Fishing rod 58 and reel 60 can be removed from its storage and transport position interior of the tube 12 (see FIGS. 3 to 6) such that a frontal portion of a fishing rod handle 68 can be set within the frontal elongated opening 36 of the tubular body while the butt end 66 of a fishing rod handle 68 inserted through the second rear circular opening 42 to thereby capture and hold the fishing rod and reel in an orientation setting its rod tip 112 and downwardly extending fishing line 114 directly over a fishing location 116 (such as, but not limited to, an ice hole) at position A. Next, the strike indicator arm 30 can be raised from its position on tube 12 such that the slidable trigger 104, interior of a strike indicator arm end cap 102, can be engaged to a select fishing line guide eyelet among a plurality of fishing line guide eyelets 110 of fishing rod and reel. The engagement can be achieved as shown in the partial view of FIG. 14 because slidable trigger 104 has an upwardly extending finger hook 108 which can be releasably lock set to one of a plurality of fishing line guide eyelets 110 so as to downwardly bend fishing rod 58 in a select position among several potential positions of diverse degrees of angular bend and loaded hold/release strike tensions.

At FIG. 12, a 24-inch fishing rod 58 and reel 60 is shown set in the tripod stand set-up position within the second rear circular opening 42 at the rear of proximal end 14 of the tube 12 and the first elongated opening 36 at the proximal frontal side of tube 12. The adjustable ring 22 is set, for example in FIG. 12, to a position approximately 9 inches below fishing rod handle 68. This exemplary setting establishes an angle of approximately 26 degrees between the tube 12 and the fishing line 114 thereby resulting in a vertical plum of fishing line 114. When the slidable trigger 104 of the strike indicator arm 30 is not engage to a selected fishing line guide eyelet, the fishing rod rod tip 112 and its fishing line 114 remains disposed at position A over the fishing location 116 with this exemplary adjustable ring 22 setting. When the finger hook 108 of the slidable trigger 104 of the strike indicator arm 30 is engaged to a selected fishing line guide eyelet 110 among the plurality of eyelets 110, such as at eyelet selected position C of upwardly extending finger hook 108 of the slidable trigger 104, the fishing rod rod tip 112 and its fishing line 114 are disposed at position B over the fishing location 116. At this position C, the selected fishing rod eyelet is downwardly extended to the intersection of arc E of the strike indicator arm 30 and arc D of the fishing rod selected eyelet compared to the same eyelet's non-engaged position. When a fish strikes a lure or hook of the fishing line 114 pulling the line 114 downward, the bend in the fishing rod increases such that the selected eyelet arcs inwardly down along arc D while the strike indicator arm 30 follows along arc E thereby causing the upwardly extending finger hook 108 of slidable trigger 104 to disengage from its selected eyelet 110. Further, this disengagement allows the strike indicator arm 30 to drop before collapsing to tube 12. The selection of the particular fishing line guide eyelet 110 to be engaged by finger hook 108 of slidable trigger 104 from among the plurality of eyelets 110 also achieves a first adjustable loaded hold/release force or strike tension for the foregoing disengagement and strike indicator arm 30 collapse. The closer an engaged eyelet is to the fishing rod rod tip 112, the "lighter" or lesser the trigger action loaded hold/release strike tension is and the "lighter" or lesser a fish must "bite" or strike to release the finger hook 108 from its engaged eyelet 110. The farther an engaged eyelet 110 is to the fishing rod rod tip 112, the "heavier" or greater the trigger action loaded hold/release strike tension is and the "heavier" or greater a fish must "bite" or strike to release the finger hook 108 from its engaged eyelet 110. This adjustable hold/release strike tension is highly advantageous because the differing strike tensions can be correlated to different types of fish or to what a fisherman considers to be an appropriate "bite" that allows, upon a fish strike, variable loaded hold/release strike tensions to be released in a variable snap up manner of the fishing rod rod tip 112 promoting increased instances of a fish lure or bait hook cleanly catching a striking fish in its frontal mouth lip as opposed to its gills or deeper in the fish mouth. This further promotes instances of safe fish release in the event of a catch of a wrong fish species, out of season fish, or fish disqualified by size or other regulation. The selection of an eyelet 110 engagement by finger hook 108 of slidable trigger 104 from among the plurality of fishing line guide eyelets 110 thus constitutes a first means for setting an adjustably variable hold/release strike tension.

FIG. 13 further illustrates how the slidable trigger 104 of the strike indicator arm 30 can be alternatively set in another manner so as to achieve variable strike tension fishing positions of a now longer fishing rod 58 among several potential positions of diverse angular bend and loaded hold/release strike tensions. At FIG. 13 a 32-inch fishing rod 58 and reel 60 is shown set in the tripod stand set-up position 34 within the second circular opening 42 at the rear of proximal end 14 of the tube 12 and the first elongated opening 36 at the proximal frontal side of tube 12. When the strike indicator arm 30 is not used after tripod stand set-up, the strike indicator arm 30 rests against the protective storage tube 12 at position F while the fishing rod rod tip 112 and its fishing line 114 are set at position G over a fishing location 116. When, after tripod stand set-up, the strike indicator arm 30 has its upwardly extending finger hook 108 of slidable trigger 104 engaged to a select fishing line guide eyelet 110 among the a plurality of fishing line guide eyelets 110, different positions of the fishing rod tip 112 and line 114 can again be set relative the fishing location 116 with a new secondary means for achieving different degrees of angular bend and loaded hold/release strike tensions of the fishing rod 58 and reel 60. In this regard, the upwardly extending finger hook 108 of slidable trigger 104 can be placed at a greater distance H from the terminal distal end 100 of the strike indicator arm end cap 102, for example at 2⅞ inches therefrom, to engage a select fishing line guide eyelet 110 among the a plurality of fishing line guide eyelets 110 and establish a position I of the rod tip 112 and its fishing line 114 over the fishing location 116. At greater distance H, the fishing rod 58 has a greater degree of angular bend and a "heavier" or greater tension to release the upwardly extending finger hook 108 of slidable trigger 104 from its engaged fishing line guide eyelet 110. Conversely, the upwardly extending finger hook 108 of slidable trigger 104 can be placed at a lesser distance J from its strike indicator arm end cap 102, for example at ⅞ inches therefrom, to engage a select fishing line guide eyelet 110 among a plurality of fishing line guide eyelets 110 and establish a position K of the rod tip 112 and its fishing line 114 over a fishing location 116. At lesser distance J, the fishing rod 58 has a lesser degree of angular bend and a "lighter" or lesser tension to release the upwardly extending finger hook 108 of slidable trigger 104 from its engaged fishing line guide eyelet 110. Thus, a greater or lesser separation of the slidable trigger 104 from terminal end 100 of end cap 102 provides an advantageous secondary means for achieving an adjustable and variable hold/release strike tension for release of the finger hook 108 from its engaged fishing line guide eyelet 110 upon a fish strike. The upwardly extending finger hook 108 of the slidable trigger 104 can be releasably lock set to one of a plurality of fishing line guide eyelets 110 at progressively greater or lesser distances from the terminal end 100 of the strike indicator arm end cap 102 so as to downwardly bend fishing rod 58 in a select position among several potential positions of diverse degrees of angular bend and loaded hold/release tensions.

In the operative engaged strike indicator arm fishing position, as shown in FIGS. 12 and 13, flag strap 32 on strike indicator arm 30 provides an elevated improved visibility and freely hangs such as in a sufficient breeze or wind to potentially impart a slight shaking motion to fishing rod rod tip 112 that vibrates fishing line 114 and its fishing lure or bait. Flag strap 32 may be colored, such as in a bright hunter's orange or a neon, to allow for better visibility of it in wintery conditions. Also, when in the operative engaged strike indicator arm fishing position, as shown in FIGS. 12 and 13, the fishing line 114 of fishing rod rod tip 112 hangs vertically downward freely extending into the fishing location which is advantageous if the fishing location is an ice hole because the extension will not contact the ice hole's edges.

It is noted that in FIGS. 12 and 13, the elastic cord 28 is selectively elected not to be used in a manner to wrap around the butt end 66 of a fishing rod handle 68 to lock set the intermediate catch member 92 into notch 88 of the adjustable ring 22. Such a use is optional in contrast to a wrapped engaged setting use of the elastic cord as detailed below.

At FIGS. 15a, 15b, 15c, and 15d there is illustrated an additional feature of the operative fishing position of the fishing rod holder and protective storage tube 10. In FIG. 15a and its enlarged call-out view of FIG. 15b, the elastic cord 28 wraps around the rear butt end 66 of a fishing rod handle 68 that extends through the second rear circular opening 42 of tube 12 in a stretched manner so as to downwardly lock set the intermediate catch member 92 into notch 88 of the adjustable ring 22. This setting is rearward of fulcrum point V. This rear setting of stretched elastic cord 28 around the butt end 66 of a fishing rod handle 68 loads an additional supplemental force to the amount of loaded forces set by the engagement of the upwardly extending finger hook 108 of the slidable trigger 104 of the strike indicator arm 30 with a select fishing line guide eyelet 110 of a tripod stand held fishing rod during the operative fishing position. This additional supplemental force thus selectively adds to the loaded hold/release strike tension achieved by the releasable engagement of the finger hook 108 to the selected fishing line guide eyelet 110 alone and creates gap L at enlarged call-out view FIG. 15b.

As shown in FIG. 15c and its enlarged call-out view of 15d, upon a fish strike the foregoing cumulative and greater holding force is released in an exaggerated and increased snap up manner of the fishing rod rod tip 112 from its pre-release lower loaded position M to post-release higher position N with the corresponding closing of gap L to non-gap 0. The snap-up release further causes an increased added travel of the fishing rod rod tip 112 and a concurrent dropping of the strike indicator arm 30 back to tube 12. The former increased rod travel provides an elevated force to the setting of the fishing lure or bait hook of fishing line 114 into the striking fish. Again, this advantageously promotes an increased instance of a fish lure or bait hook cleanly catching a striking fish in its frontal mouth lip as opposed to its gills or deeper in the fish mouth which in turn beneficially allows for greater instances of safe fish release in the event of a catch of a wrong fish species, out of season fish, or fish disqualified by size or other regulation. Further, the latter dropping of the strike indicator arm 30 and its flag strap 32 back to tube 12 readily indicates a fish strike to a fishing observer.

FIG. 16a and its enlarged call-out view of 16b are similar to the fishing set-up of the fishing rod holder and protective storage tube of FIGS. 15a, 15b, but now shows the elastic cord 28 wrapped around a frontal portion 118 of the fishing rod handle 68 near the frontal face 120 of the protective storage tube. In this set-up, the fishing rod handle 68 is in its customary set-up position wherein the butt end 66 of the fishing rod handle 68 extends through the second rear circular opening 42 while a frontal portion 118 of a fishing rod handle is set within the frontal elongated opening 36 of the tubular body 12. But now the elastic cord 28 wraps around a frontal portion 118 of the fishing rod handle 68 near the frontal face 120 of the protective storage tube forward of the fulcrum point V in a stretched manner that downwardly lock sets the intermediate catch member 92 into notch 88 of the adjustable ring 22. This frontal position of the elastic cord relative the protective tube 12 and the fulcrum point V increases the hold position of the rod handle 68 in its tripod set position through the first elongated opening 36 and the second rear circular opening 42 of tube 12 and does not add forces to the strike tension (as otherwise established by the releasable engagement of the upwardly extending finger hook to a selected fishing line guide eyelet and/or adjustment of the distance the slidable trigger 104 and its upwardly extending finger hook 108 is from the terminal distal end 100 of the strike indicator arm end cap 102).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect. It will be understood by those skilled in the art that various changes in form and details may be made therein without departing from the spirit and scope of the invention.

I claim:

1. A protective storage tube convertible to a fishing rod holder with a strike indicator arm comprising:
   a tubular body having a proximal section and a distal section, the proximal section having a rear circular opening and a frontal opening therein, the tubular body being elongated and providing an internal hollowed area capable of a reception of a fishing rod therein during storage or transport of the protective storage tube;
   a ring having an internal surface surrounding an external surface of the tubular body, the ring having two externally facing notches each housing an end of a leg of a pair of legs, the pair of legs and tubular body capable of forming a tripod stand; and
   the ring further having a third externally facing notch housing a proximal end of a strike indicator arm, the strike indicator arm having a slidable trigger capable of being releasably engaged with one of a plurality of fishing line guide eyelets of a fishing rod.

2. The protective storage tube of claim 1 wherein the pair of legs are pivotally movable to a first retracted closed position and a second extended open position.

3. The protective storage tube of claim 1 wherein the ring is slidably adjustable along the tube.

4. The protective storage tube of claim 1 wherein the slidable trigger includes an upwardly extending finger hook capable of a releasable engagement with one of a plurality of fishing line guide eyelets of a fishing rod.

5. The protective storage tube of claim 4 wherein the upwardly extending finger hook of the slidable trigger is capable of a releasable engagement with a select fishing line guide eyelet of a fishing rod to establish a select strike tension among potential variable strike tensions.

6. The protective storage tube of claim 1 wherein the strike indicator arm includes an end cap at its distal end and the slidable trigger is capable of an engagement with a select fishing line guide eyelet of a fishing rod at varying distances from the end cap.

7. The protective storage tube of claim 6 wherein the distance of the slidable trigger from the end cap during an engagement with a select fishing line guide eyelet of a fishing rod establishes a select strike tension among potential variable strike tensions.

8. The protective storage tube of claim 1 wherein the pair of legs includes a toothed distal end cap.

9. The protective storage tube of claim 1 wherein the strike indicator arm further includes a flag strap capable of being wrapped around the protective storage tube to strap hold the pair of legs in a retracted closed storage position and capable of serving as a free standing flag when the pair of legs and the protective storage tube forms a tripod stand and the slidable trigger of the indicator arm is engaged to a fishing line guide eyelet of a fishing rod.

10. The protective storage tube of claim 1 wherein the tubular body includes one or more of measurement, name, contact information, identity, or advertisement indicia.

11. The protective storage tube of claim 1 wherein the tubular body further includes a second rear opening suited for a cooperative mounting of the tube in a storage position.

12. The protective storage tube of claim 1 wherein the frontal opening of the tubular body defines an anti-chafing slot capable of reception of a fishing line of a fishing rod stored in the hollowed interior of the tubular body during storage or transport of the tubular body.

13. A fishing rod holder with a strike indicator arm comprising:
    a tubular body having a proximal section and a distal section, the proximal section having a rear circular opening and a frontal opening therein, the tubular body being elongated and providing an internal hollowed area capable of a reception of a fishing rod therein during storage or transport of the protective storage tube;
    a ring having an internal surface surrounding an external surface of the tubular body, the ring having two externally facing notches each of which pivotally houses an end of a leg of a pair of legs, the pair of legs and tubular body capable of forming a tripod stand;
    the ring further having a third externally facing notch which pivotally houses a strike indicator arm, the strike indicator arm having a slidable trigger that includes an upwardly extending finger hook capable of releasable engagement with one of a plurality of fishing line guide eyelets of a fishing rod;
    the ring further having a lock cavity housing an end of an elastic cord and a fourth notch for releasably housing of either an intermediate catch member or an end-catch member of the elastic cord;
    the tubular body, after a tripod stand set-up, being capable of having a fishing rod held in the tripod stand by a frontal portion of a fishing rod handle being set within the frontal opening of the tubular body and a rear portion of the fishing rod handle being inserted through the rear circular opening; and
    wherein the elastic cord is capable of being wrapped around either the rear or the frontal portion of a fishing rod handle at, respectively, either a rear or a frontal side of the tubular body, with a releasable setting of either the intermediate catch member or an end catch member of the elastic cord within the fourth notch, the rear wrapping setting thereof being capable of providing a supplemental strike tension during a releasable engagement of the upwardly extending finger hook of the slidable trigger with one of a plurality of fishing line guide eyelets of a fishing rod.

14. The fishing rod holder of claim 13 wherein the upwardly extending finger hook of the slidable trigger is capable of a releasable engagement with a select fishing line guide eyelet of a fishing rod to establish a select strike tension among potential variable strike tensions.

15. The fishing rod holder of claim 13 wherein the strike indicator arm includes an end cap at its distal end and the upwardly extending finger hook of the slidable trigger is capable of an engagement with a select fishing line guide eyelet of a fishing rod at varying distances from the end cap.

16. The fishing rod holder of claim 15 wherein the distance of the upwardly extending finger hook of the slidable trigger from the end cap during an engagement with a select fishing line guide eyelet of a fishing rod establishes a select strike tension among potential variable strike tensions.

17. A protective storage tube convertible to a fishing rod holder with a strike indicator arm in combination with a fishing rod comprising:
- a tubular body having a proximal section and a distal section, the proximal section having a rear circular opening and a frontal opening therein, the tubular body being elongated to provide an internal hollowed area suitable for reception of the fishing rod therein during storage or transport of the protective storage tube;
- a ring having an internal surface surrounding an external surface of the tubular body, the ring having two externally facing notches each of which pivotally houses an end of a leg of a pair of legs, the pair of legs and tubular body capable of forming a tripod stand;
- the ring further having a third externally facing notch which pivotally houses a strike indicator arm, the strike indicator arm having a slidable trigger that includes an upwardly extending finger hook capable of releasable engagement with one of a plurality of fishing line guide eyelets of the fishing rod;
- the ring further having a lock cavity housing an end of an elastic cord and a fourth notch for releasably setting of either an intermediate catch member or an end catch member of the elastic cord therein;
- the tubular body, after a tripod stand set-up, being capable of having the fishing rod held in the tripod stand by a frontal portion of a fishing rod handle being set within the frontal opening of the tubular body and a rear portion of the fishing rod handle being inserted through the rear circular opening of the tubular body; and
- wherein the elastic cord being is capable of being wrapped around either the rear or the frontal portion of the fishing rod handle at, respectively, either a rear or a frontal side of the tubular body, with a releasable setting of either the intermediate catch member or an end catch member of the elastic cord within the fourth notch, the rear wrapping setting thereof being capable of providing a supplemental strike tension during a releasable engagement of the upwardly extending finger hook of the slidable trigger with one of a plurality of fishing line guide eyelets of the fishing rod.

18. The protective storage tube in combination with a fishing rod of claim 17 wherein the upwardly extending finger hook of the slidable trigger is capable of a releasable engagement with a select fishing line guide eyelet of the fishing rod to establish a select strike tension among potential variable strike tensions.

19. The protective storage tube in combination with a fishing rod of claim 17 wherein the strike indicator arm includes an end cap at its distal end and the upwardly extending finger hook of the slidable trigger is capable of an engagement with a select fishing line guide eyelet of the fishing rod at varying distances from the end cap.

20. The protective storage tube in combination with a fishing rod of claim 17 wherein the distance of the upwardly extending finger hook of the slidable trigger from the end cap during an engagement with a select fishing line guide eyelet of the fishing rod establishes a select strike tension among potential variable strike tensions.

21. A protective storage tube convertible to a fishing rod holder with a strike indicator arm comprising:
- a tubular body having a proximal section and a distal section, the proximal section having a rear circular opening and a frontal opening therein, the tubular body being elongated;
- a ring having an internal surface surrounding an external surface of the tubular body, the ring having two externally facing notches each of which pivotally houses an end of a leg of a pair of legs, the pair of legs and tubular body capable of forming a tripod stand;
- the ring further having a third externally facing notch which pivotally houses a strike indicator arm, the strike indicator arm having a first means for establishing a select strike tension among potential variable strike tensions and a second means for establishing a select strike tension among potential variable strike tensions.

22. The protective storage tube of claim 21 wherein the ring further has a lock cavity housing an end of an elastic cord and a fourth notch for releasable setting of either an intermediate catch member or an end catch member of the elastic cord therein, the releasable setting providing a third means for establishing a select strike tension among potential variable strike tensions.

23. A protective storage tube convertible to a fishing rod holder with a strike indicator arm in combination with a fishing rod comprising:
- a tubular body having a proximal section and a distal section, the proximal section having a rear circular opening and a frontal opening therein, the tubular body being elongated and providing an internal hollowed area capable of a reception of a fishing rod therein during storage or transport of the protective storage tube;
- a ring having an internal surface surrounding an external surface of the tubular body, the ring having two externally facing notches each of which pivotally houses an end of a leg of a pair of legs, the pair of legs and tubular body capable of forming a tripod stand;
- the ring further having a third externally facing notch which pivotally houses a strike indicator arm, the strike indicator arm having a first means for establishing a select strike tension among potential variable strike tensions and a second means for establishing a select strike tension among potential variable strike tensions.

24. The protective storage tube of claim 23 wherein the ring further has a lock cavity housing an end of an elastic cord and a fourth notch for releasable setting of either an intermediate catch member or an end catch member of the elastic cord therein, the releasable setting providing a third means for establishing a select strike tension among potential variable strike tensions.

* * * * *